(12) United States Patent  (10) Patent No.: US 9,143,630 B2
Hayashi et al.  (45) Date of Patent: Sep. 22, 2015

(54) PHOTOGRAPHING DEVICE WITH A MIRROR TO PHOTOGRAPH A DISPLAY

(71) Applicant: FUJI XEROX CO., LTD., Tokyo (JP)

(72) Inventors: Kazuhiro Hayashi, Kanagawa (JP); Shinobu Ozeki, Kanagawa (JP); Akira Tateishi, Kanagawa (JP); Masaru Kijima, Kanagawa (JP); Motoki Taniguchi, Kanagawa (JP); Eisaku Hayashi, Kanagawa (JP); Kazushige Oi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 99 days.

(21) Appl. No.: 13/907,036

(22) Filed: May 31, 2013

(65) Prior Publication Data
US 2014/0055626 A1  Feb. 27, 2014

(30) Foreign Application Priority Data
Aug. 27, 2012 (JP) ................... 2012-186368

(51) Int. Cl.
H04N 5/225 (2006.01)
H04N 1/00 (2006.01)
H04N 1/195 (2006.01)

(52) U.S. Cl.
CPC ....... *H04N 1/00129* (2013.01); *H04N 1/00246* (2013.01); *H04N 1/19589* (2013.01); *H04N 1/19594* (2013.01); *H04N 2201/0084* (2013.01); *H04N 2201/0438* (2013.01)

(58) Field of Classification Search
USPC .......................... 348/375–376; 396/419, 428
See application file for complete search history.

(56) References Cited

U.S. PATENT DOCUMENTS

| | | | | |
|---|---|---|---|---|
| 5,947,577 A | * | 9/1999 | Jikihara et al. | 353/97 |
| 6,731,778 B1 | * | 5/2004 | Oda et al. | 382/118 |
| 7,184,796 B2 | * | 2/2007 | Karidis et al. | 455/566 |
| 7,441,905 B2 | * | 10/2008 | Tseng et al. | 353/63 |
| 8,054,379 B2 | | 11/2011 | Yuan | 348/376 |
| 8,368,795 B2 | * | 2/2013 | Lo et al. | 348/333.02 |
| 2003/0090794 A1 | | 5/2003 | Chatani et al. | |
| 2003/0181225 A1 | * | 9/2003 | Hasegawa et al. | 455/566 |
| 2007/0009629 A1 | | 1/2007 | Okumura et al. | |
| 2010/0328420 A1 | * | 12/2010 | Roman | 348/14.08 |
| 2011/0081946 A1 | * | 4/2011 | Singh | 455/556.1 |
| 2011/0254864 A1 | | 10/2011 | Tsuchikawa et al. | |
| 2012/0135803 A1 | | 5/2012 | Nonaka et al. | |

FOREIGN PATENT DOCUMENTS

| | | |
|---|---|---|
| JP | A 2003-75722 | 3/2003 |
| JP | A 2005-5816 | 1/2005 |
| JP | A 2006-211367 | 8/2006 |
| JP | A 2007-41538 | 2/2007 |
| JP | A 2011-227574 | 11/2011 |
| JP | A 2012-115414 | 6/2012 |

* cited by examiner

*Primary Examiner* — Ngoc-Yen Vu
(74) *Attorney, Agent, or Firm* — Oliff PLC

(57) ABSTRACT

A photographing device includes a display that displays a screen, a photographing unit that is arranged on the same plane as the display, and a mirror that is arranged so that at least a portion of the display is capable of being photographed by the photographing unit.

19 Claims, 10 Drawing Sheets

PHOTOGRAPHING DEVICE WITH A MIRROR TO PHOTOGRAPH A DISPLAY

CROSS-REFERENCE TO RELATED APPLICATIONS

This application is based on and claims priority under 35 USC 119 from Japanese Patent Application No. 2012-186368 filed Aug. 27, 2012.

BACKGROUND

Technical Field

The present invention relates to a photographing device, and a mirror.

SUMMARY

According to an aspect of the invention, there is provided a photographing device including a display that displays a screen, a photographing unit that is arranged on the same plane as the display, and a mirror that is arranged so that at least a portion of the display is capable of being photographed by the photographing unit.

BRIEF DESCRIPTION OF THE DRAWINGS

Exemplary embodiments of the present invention will be described in detail based on the following figures, wherein.

DETAILED DESCRIPTION

Next, exemplary embodiments of the invention will be described on the basis of the drawings.

Figure 1:
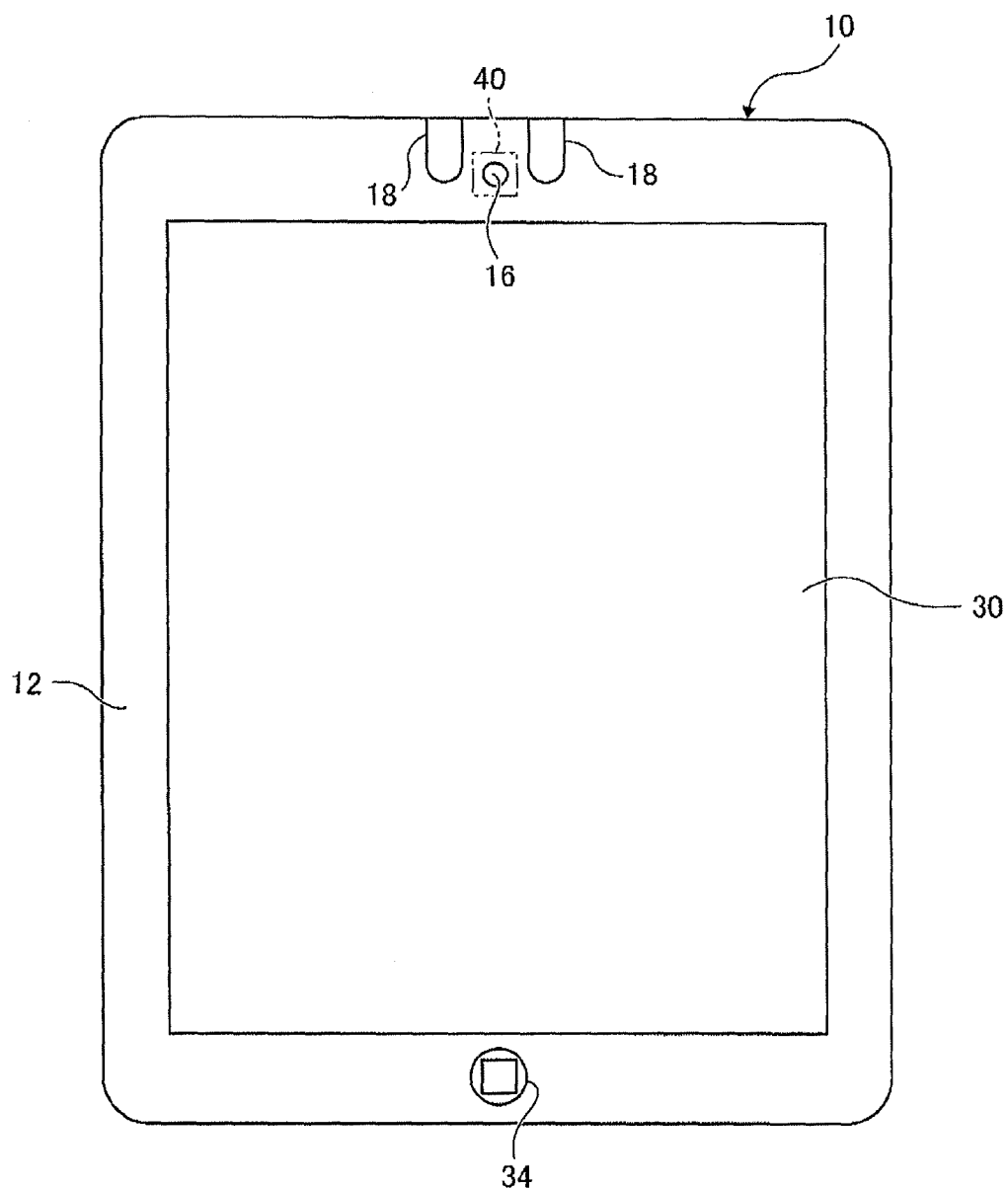
FIG. 1 is a plan view showing a photographing device related to a first exemplary embodiment of the invention.
Figure 2:
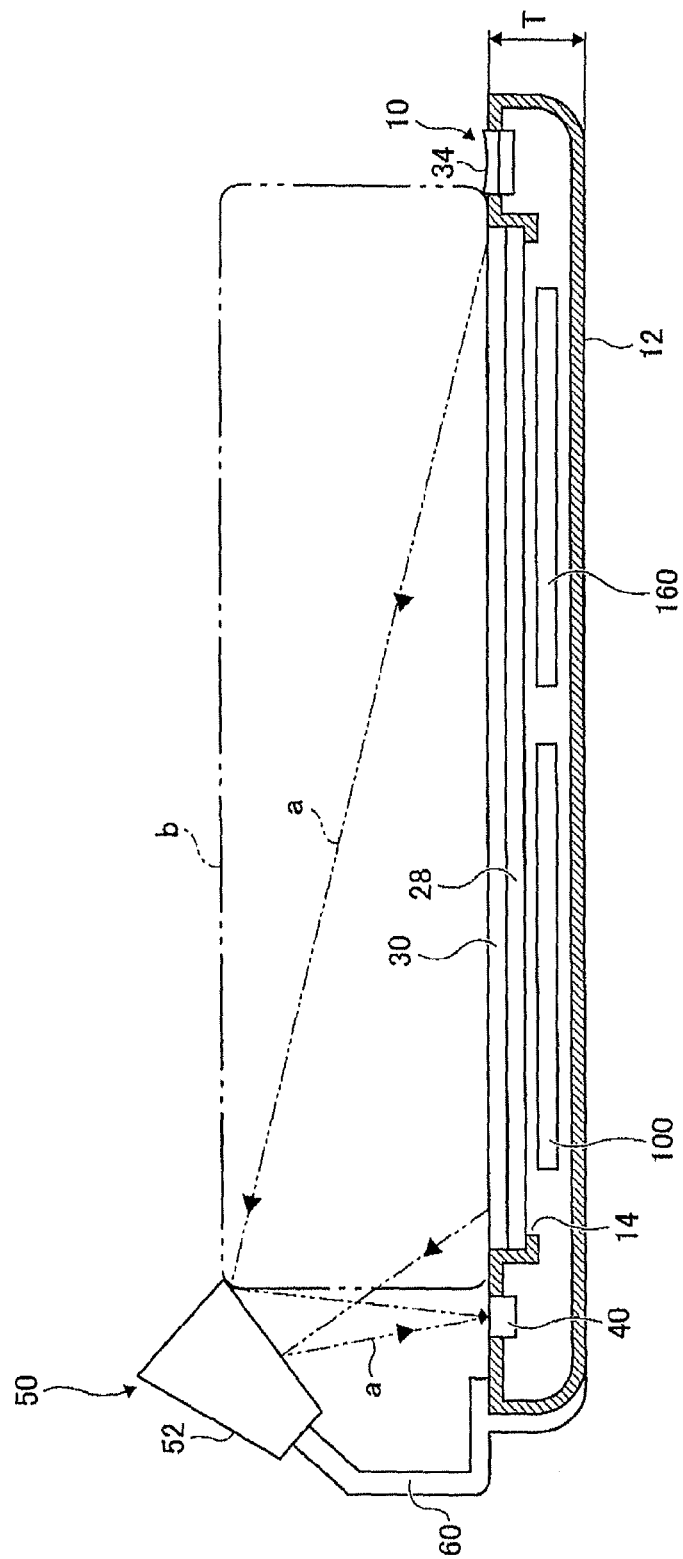
FIG. 2 is a cross-sectional view of the photographing device shown in FIG. 1.

A tablet apparatus 10 related to a first exemplary embodiment of the invention is shown in FIGS. 1 and 2. Here, the tablet apparatus 10 in a state where a reflecting mirror 50 to be described below is removed is shown in FIG. 1, and the tablet apparatus 10 in a state where the reflecting mirror 50 to be described below is mounted is shown in FIG. 2.

The tablet apparatus 10 is used as a photographing device, and has a tablet apparatus body 12. A mounting opening portion 14 is formed in an upward surface of the tablet apparatus body 12, and a liquid crystal display device 28 used as a display that displays a screen is mounted so as to fit into the mounting opening portion 14. Additionally, the tablet apparatus 10 has a touch panel 30.

The touch panel 30 is used as an input unit for inputting data, and is arranged so as to overlap the liquid crystal display device 28. An icon or the like for operating an application under use are displayed on the liquid crystal display device 28, and the input for operating the application is performed as an operator operates positions that overlap the icon of the touch panel 30. More specifically, an input operation is performed, for example, as the operator touches the position that overlaps the icon displayed by the touch panel 30 with an operator's own finger or a stylus (not shown) for operation. Additionally, the tablet apparatus 10 has a power switch 34.

The power switch 34 is used in order to turn on or off a power source of the tablet apparatus 10, and is attached to the tablet apparatus body 12 so that the power switch can be operated from the upward surface of the tablet apparatus body 12. Additionally, the tablet apparatus 10 has a controller 100.

The controller 100 has, for example, control circuits, such as a CPU, is constituted as, for example, a substrate, and is attached to a position below the touch panel 30 and the liquid crystal display device 28 of the tablet apparatus body 12. The controller 100 is used as a position calculation section that calculates the position of an object to be photographed to be described below, and is used as a motion calculation section that calculates the motion of a portion to be photographed to be described below. Additionally, the controller 100 is used as a display controller that controls the display of the liquid crystal display device 28 on the basis of at least any one of the calculated position and motion of the portion to be photographed. Additionally, the tablet apparatus 10 has an interface circuit 160.

The interface circuit 160 is, for example, a circuit including a CPU or the like, is constituted as, for example, a substrate, and is attached to a position below the touch panel 30 and the liquid crystal display device 28 of the tablet apparatus body 12. The interface circuit 160 is connected to the touch panel 30 and the controller 100, and the input from the touch panel 30 to the controller 100 is performed via the interface circuit 160. Additionally, the tablet apparatus 10 has a CCD camera 40.

The CCD camera 40 is used as a photographing unit, and is arranged on the same plane as the screen of the liquid crystal display device 28. Here, the same plane means being on a substantially same plane, and also includes, for example, a position that varies vertically within a range of the thickness T of the tablet apparatus body 12 in a direction perpendicular to the screen of the liquid crystal display device 28. Additionally, the CCD camera 40 is attached to the upward surface of the tablet apparatus body 12 so that the light that has entered via the opening portion 16 for photographing formed in the tablet apparatus body 12 can be photographed.

The CCD camera 40 is designed so as to photograph mainly an operator's face or the like. For this reason, a range where photographing can be performed by the CCD camera 40 becomes within a range of an upward constant angle with respect to the tablet apparatus body 12. The display screen of the liquid crystal display device 28 is out of the range of an angle capable of be photographed, and in a case where the CCD camera 40 is used, the screen surface of the liquid crystal display device cannot be photographed using the CCD camera 40. Additionally, the tablet apparatus 10 has the reflecting mirror 50.

The reflecting mirror 50 is used as a mirror that is arranged so that at least a portion of the display of the liquid crystal display device 28 can be photographed by the CCD camera 40. The reflecting mirror 50 has a reflecting part 52 that reflects light, and a supporting part 60 that supports the reflecting part 52. The reflecting part 52 is a member that reflects light at an outer peripheral portion, and the shape of the outer peripheral portion has, for example, curved surface shape. Here, examples of the curved surface shape may include a spherical surface shape and an aspheric surface shape, and examples of the aspheric surface shape may include a hyperboloidal surface and the like and may include a portion of an elliptic paraboloidal surface and a portion of a revolution surface of paraboloid. Additionally, the surface shape of the reflecting part 52 is, for example, a shape that is curved at least in any direction of two mutually intersecting directions in a surface.

In the example shown in FIGS. 1 and 2, the reflecting mirror 50 has a surface shape including a portion of a conical shape. In this case, the direction of a generatrix in the surface is a straight line, and is curved in a direction that intersects the direction of this generatrix. As described above, although reflecting parts with various outer peripheral shapes can be used as the reflecting part 52, it is desirable to use an outer peripheral shape capable of photographing the total range of the display screen of the liquid crystal display device 28, with the CCD camera 40. Since the outer peripheral shape of the reflecting mirror 50 shown in FIG. 2 is an aspheric surface, and is a shape that forms a portion of a conical shape, the reflecting mirror has a shape capable of photographing the total range of the display screen of the liquid crystal display device 28, using the CCD camera 40 as shown by a two-dot chain line in FIG. 2.

The supporting part 60 has one end portion fixed to portions other than a surface that reflects the light of the reflecting part 52. Additionally, the other end portion of the supporting part 60 can be attached to and detached from the tablet apparatus body 12, for example so as to fit into the tablet apparatus body 12. More specifically, the reflecting mirror 50 can be mounted on the tablet apparatus body 12 using the supporting part 60, for example, by fitting the supporting part 60 into a mounted portion 18 of the tablet apparatus body 12, and the reflecting mirror 50 can be removed from the tablet apparatus body 12 by removing the supporting part 60 from the mounted portion 18.

If the reflecting mirror 50 is mounted on the tablet apparatus 10 using the supporting part 60, the reflecting mirror 50 is brought into a fixed state in the vicinity of the CCD camera 40, and the positional relationship between the reflecting mirror 50 and the CCD camera 40 is brought into a fixed state.

Two-dot chain lines b shown in FIG. 2 show the outline of a range where photographing can be performed by the CCD camera 40 in a state where the reflecting mirror 50 is attached to the tablet apparatus body 12.

Figure 3:
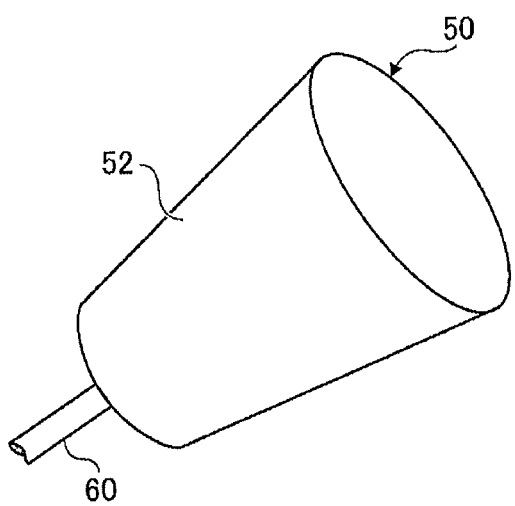
FIG. 3 is a perspective view showing a mirror to be used in the photographing device shown in FIG. 1.

The reflecting mirror 50 is shown in FIG. 3. The reflecting mirror 50 has the reflecting part 52 that has a portion of a conical shape as the outer peripheral shape as described above, and the supporting part 60 that supports the reflecting part 52.

Figure 4:
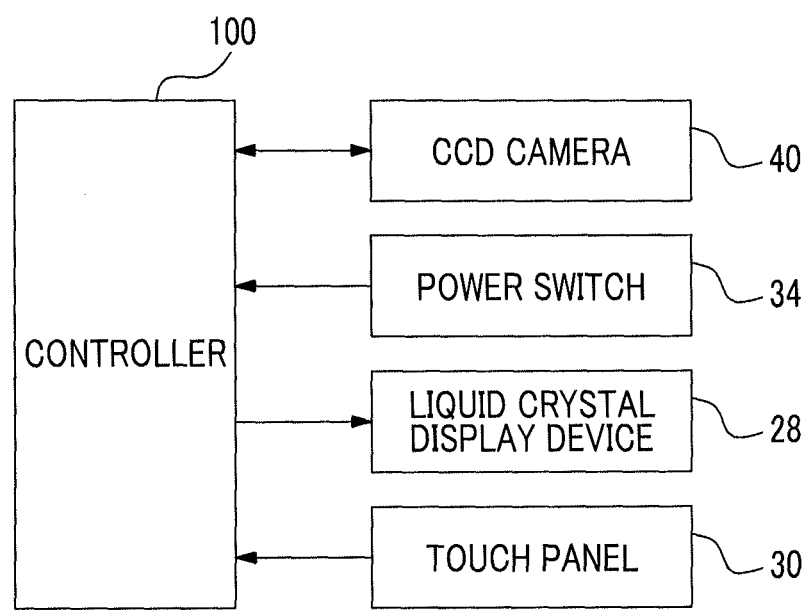
FIG. 4 is a block diagram showing the configuration of a controller of the photographing device shown in FIG. 1.

FIG. 4 is a block diagram showing the configuration of the controller of the tablet apparatus 10.

As shown in FIG. 4, the aforementioned CCD camera 40, power switch 34, liquid crystal display device 28, and touch panel 30 are coupled to the aforementioned controller 100.

Input from the CCD camera 40, the power switch 34, and the touch panel 30 is performed on the controller 100, and the CCD camera 40, the liquid crystal display device 28, and the touch panel 30 are controlled by the controller 100.

Additionally, the controller 100 can calculate the position of an object to be photographed, such as an operator's finger or a stylus (not shown), with respect to the display screen of the liquid crystal display device 28 photographed by the CCD camera 40, using the input data from CCD camera 40. Additionally, the controller 100 can calculate the motion of an object to be photographed, such as an operator's finger or a stylus, with respect to the display screen of the liquid crystal display device 28 photographed by the CCD camera 40, using the input data from CCD camera 40.

Additionally, the controller 100 can control the display of the liquid crystal display device 28 on the basis of the position or motion of an object to be photographed, such as an operator's finger or a stylus, with respect to the display screen of the liquid crystal display device 28 photographed by the CCD camera 40. More specifically, for example, in a case where an operator's finger or a stylus approach the liquid crystal display device 28, an icon displayed on the display screen of the liquid crystal display device 28 to be operated at that point can be enlarged, or a color that displays the icon can be changed.

Figure 5:
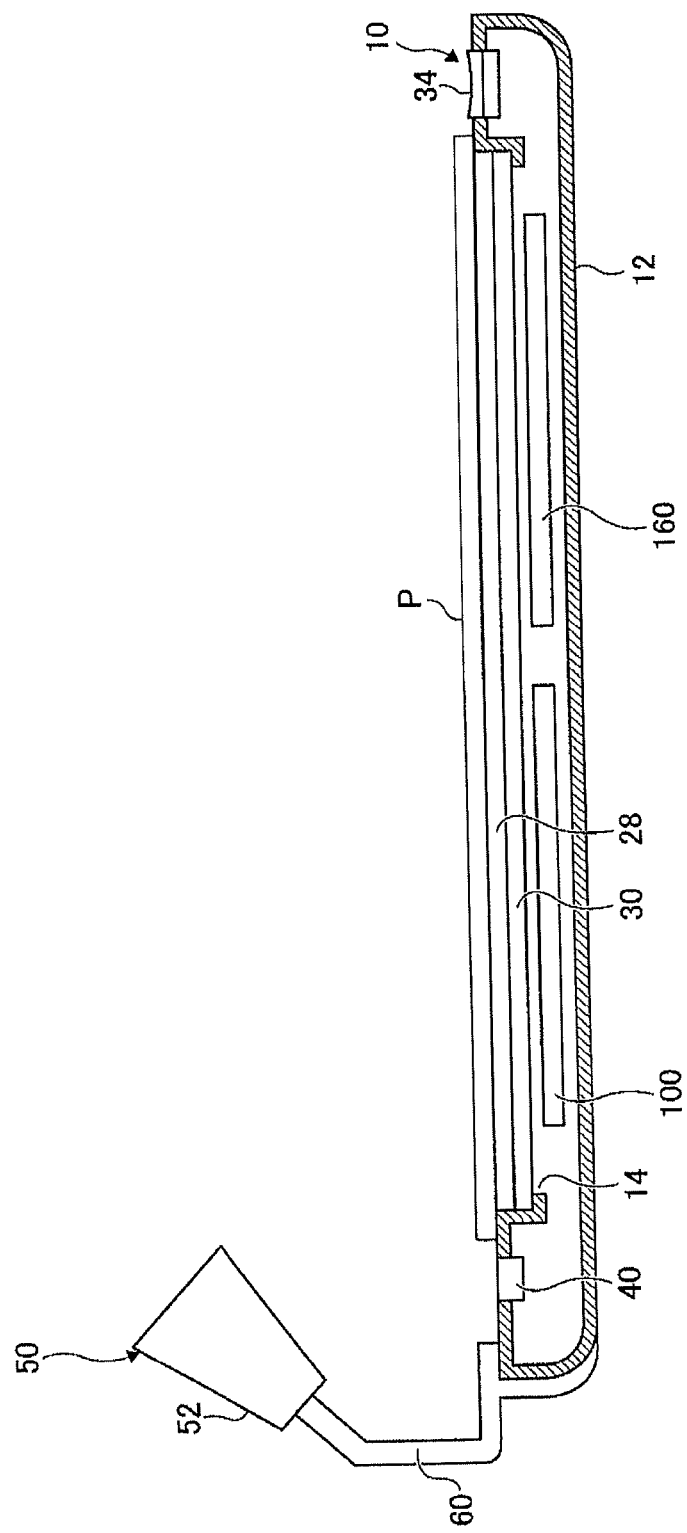
FIG. 5 is a view illustrating the photographing of paper using the photographing device shown in FIG. 1.

A state where paper P used as a recording medium is photographed by the tablet apparatus 10 is shown in FIG. 5. In a case where the paper P is photographed, the tablet apparatus body 12 is used as a platform on which the paper is placed. Additionally, an apparatus for photographing paper only may be configured. In this case, the liquid crystal display device 28 and the touch panel 30 that are mounted on the tablet apparatus body 12 become unnecessary.

Figure 6:
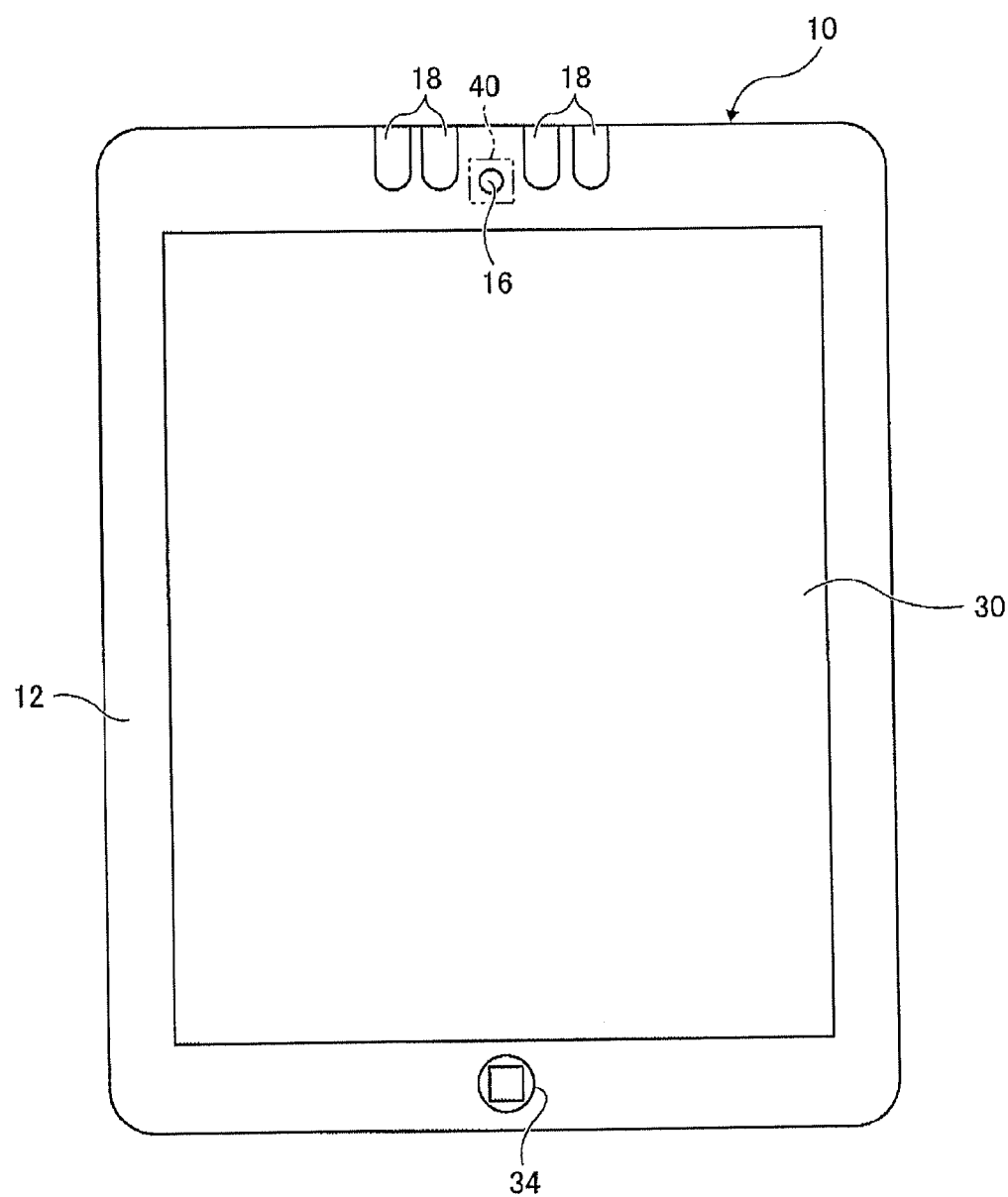
FIG. 6 is a plan view showing a photographing device related to a second exemplary embodiment of the invention.

A tablet apparatus 10 related to a second exemplary embodiment of the invention is shown in FIG. 6. The tablet apparatus 10 related to the aforementioned first exemplary embodiment has one reflecting mirror 50, and the reflecting mirror 50 is attached to the mounted portion 18 of the tablet apparatus body 12. In contrast, in the tablet apparatus 10 related to the second exemplary embodiment, the tablet apparatus body 12 has plural mounted portions 18, and plural reflecting mirrors 50 are mounted on the plural mounted portions 18. More specifically, in the tablet apparatus 10 related to the second exemplary embodiment, the tablet apparatus body 12 has two mounted portions 18, and a total of two reflecting mirrors 50 are mounted on the two mounted portions, respectively. Additionally, in the second exemplary embodiment, for example, a stereoscopic image of the object to be photographed that is present within a range shown with the two-dot chain lines b in FIG. 2 can be taken as the controller 100 performs calculation on the basis of the parallax of light reflected by each of the two reflecting mirrors 50. That is, the controller 100 acquires positional information on three dimensions of the object to be photographed.

Since the configuration of the tablet apparatus 10 related to the second exemplary embodiment other than the portions different from the tablet apparatus 10 related to the first exemplary embodiment described above is the same as that of the first tablet apparatus 10, repeated description is omitted.

Figure 7:
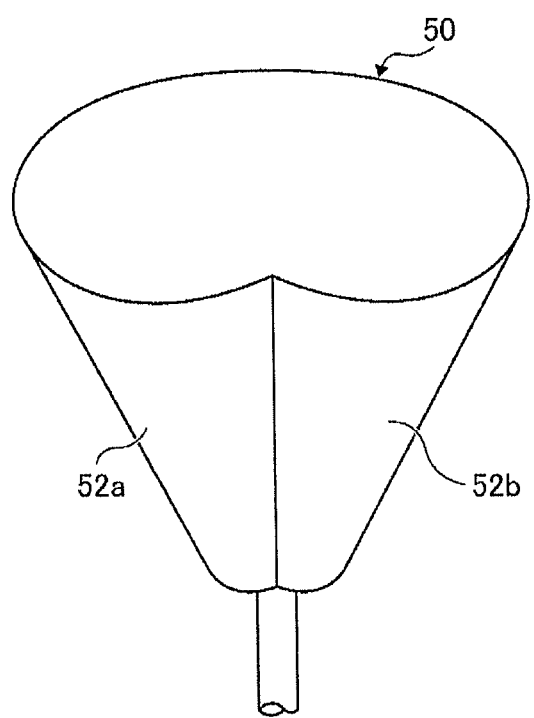
FIG. 7 is a perspective view showing a mirror to be used in the photographing device related to a third exemplary embodiment of the invention.

A reflecting mirror 50 used for a tablet apparatus related to the third exemplary embodiment of the invention is shown in FIG. 7. In the tablet apparatus 10 related to the aforementioned first exemplary embodiment, a mirror having one reflecting surface is used as the reflecting mirror 50 (refer to FIG. 3). In contrast, in the tablet apparatus 10 related to the third exemplary embodiment, a reflecting mirror 50 that is generally called a polygon mirror and has a reflecting part 52a and a reflecting part 52b that are two reflecting surfaces as shown in FIG. 7 is used. The shapes of the reflecting part 52a and the reflecting part 52b are aspheric surfaces, respectively. The configuration of the tablet apparatus 10 related to the third exemplary embodiment other than the portions different from the tablet apparatus 10 related to the first exemplary embodiment described above is the same as that of the first tablet apparatus 10.

Additionally, in the tablet apparatus 10 related to the aforementioned second exemplary embodiment, the two reflecting mirrors 50 are used in order to take the stereoscopic image of the object to be photographed. In contrast, in the third exemplary embodiment, a stereoscopic image can be taken similarly to the aforementioned second exemplary embodiment. However, the number of the reflecting mirror 50 itself is one, and a stereoscopic image can be taken using two reflecting parts (reflecting surfaces) of one reflecting mirror 50 instead of using the two reflecting mirrors 50. That is, in the third exemplary embodiment, for example, a stereoscopic image of the object to be photographed that is present within a range shown with the two-dot chain lines b in FIG. 2 can be taken as the controller 100 (refer to FIG. 4) performs calculation on the basis of the parallax of light reflected by each of the reflecting part 52a and reflecting part 52b. That is, the controller 100 acquires positional information on three dimensions of the object to be photographed.

Figure 8:
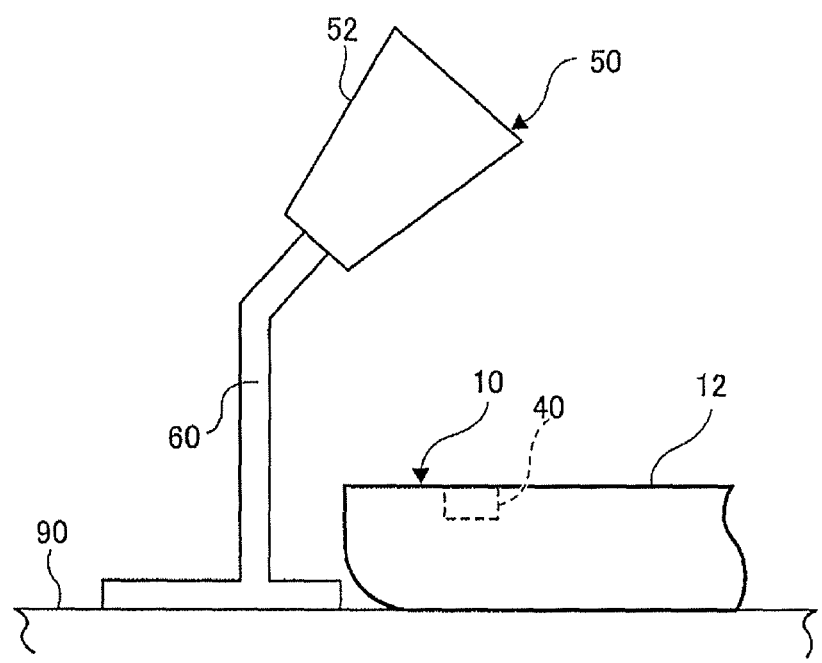
FIG. 8 is a view showing a first modified example of the mirror to be used in the photographing device shown in FIG. 1 and the photographing device shown in FIG. 6, and the mirror shown in FIG. 7.

A first modified example of the reflecting mirror 50 used for the tablet apparatus 10 related to any one of the first exemplary embodiment, the second exemplary embodiment, and the third exemplary embodiment is shown in FIG. 8. In the reflecting mirror 50 used for the tablet apparatus 10 related to any one of the aforementioned first exemplary embodiment, second exemplary embodiment, and third exemplary embodiment, the reflecting mirror 50 can be attached to and detached from the tablet apparatus body 12 using the supporting part 60, and can be fixed to the tablet apparatus body 12. In contrast, in the first modified example, the supporting part 60 of the reflecting mirror 50 supports the reflecting part 52 so as to be placed on an installation surface 90 in which the tablet apparatus 10 is installed in use. The reflecting mirror 50 related to the first modified example can be used, for example, so as to be placed on the installation surface 90 so that the reflecting part 52 is located in the vicinity of the CCD camera 40.

Figure 9:
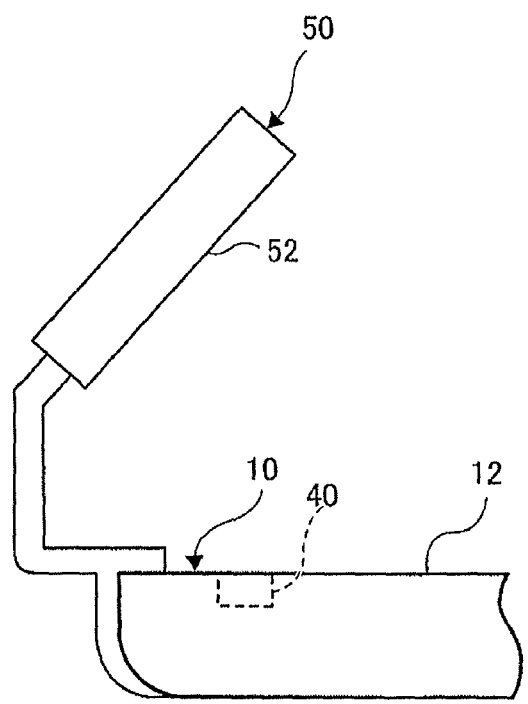
FIG. 9 is a view showing a second modified example of the mirror to be used in the photographing device shown in FIG. 1 and the photographing device shown in FIG. 6.

A second modified example of the reflecting mirror 50 used for the tablet apparatus 10 related to the first exemplary embodiment and the tablet apparatus 10 related to the second exemplary embodiment is shown in FIG. 9. In the reflecting mirror 50 used for the tablet apparatus 10 related to the aforementioned first exemplary embodiment and the tablet apparatus 10 related to the aforementioned second exemplary embodiment, the reflecting part 52 has an outer peripheral shape that forms a portion of a conical shape. In contrast, in the second modified example, the reflecting surface of the reflecting part 52 is a plane. Since the shape of the reflecting part 52 is a plane, if the reflecting mirror 50 related to the second modified example is used, a region that cannot be photographed by the CCD camera 40 is generated in the display screen of the liquid crystal display device 28. For this reason, in a case where all the regions of the front screen of the liquid crystal display device 28 are photographed, the reflecting part 52 needs to use the reflecting mirror 50 that has an outer peripheral shape that forms a portion of a conical shape, instead of the reflecting mirror 50 related to the second modified example.

In addition, in the earlier description, the reflecting mirror 50 in which the respective shapes of the reflecting part 52a and the reflecting part 52b are aspheric surfaces has been described as an example of the reflecting mirror used for the tablet apparatus 10 related to the third exemplary embodiment. However, in the tablet apparatus 10 related to the third exemplary embodiment, a reflecting mirror in which the respective shapes of the reflecting part 52a and the reflecting part 52b are planes may be used.

Figure 10:
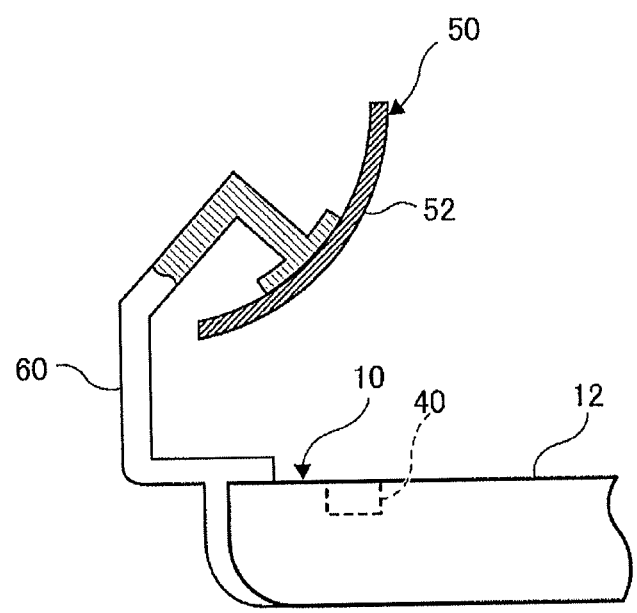
FIG. 10 is a view showing a third modified example of the mirror to be used in the photographing device shown in FIG. 1 and the photographing device shown in FIG. 6.

A third modified example of the reflecting mirror 50 used for the tablet apparatus 10 related to the first exemplary embodiment and the tablet apparatus 10 related to the second exemplary embodiment is shown in FIG. 10. In the reflecting mirror 50 used for the tablet apparatus 10 related to the aforementioned first exemplary embodiment and the tablet apparatus 10 related to the aforementioned second exemplary embodiment, the reflecting part 52 has an outer peripheral shape that forms a portion of a conical shape. In contrast, in the third modified example, the shape of the outer peripheral portion of the reflecting part 52 is an aspheric surface shape that is convex to the tablet apparatus body 12 side, for example, a hyperboloidal surface shape. For this reason, the shape of the outer peripheral portion is a shape that is curved in both directions of two mutually intersecting directions in the surface of the outer peripheral portion.

The reflecting mirror 50 related to the first modified example described above and the reflecting mirror 50 related to the second modified example or the reflecting mirror 50 related to the third modified example can also be used in combination. That is, the supporting part 60 of the reflecting mirror 50 can be placed on the installation surface 90, and the reflecting part 52 can be formed into a plane or can be an aspheric surface that is convex to the tablet apparatus body 12 side.

As described above, the invention can be applied to a photographing device and a mirror.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A photographing device comprising:
   a display that displays a screen;
   a photographing unit that is arranged on the same plane as the display; and
   a mirror that is arranged so that at least a portion of the display is capable of being photographed by the photographing unit,
   wherein the photographing unit is arranged at a position such that the photographing unit does not intersect any lines penetrating the screen, the lines being perpendicular to the screen.

2. The photographing device according to claim 1, wherein the mirror includes a curved shape, a curved convex surface faces the photographing unit, and the convex surface is arranged so as to incline with respect to a plane of the display.

3. The photographing device according to claim 2, wherein the mirror includes a shape having at least two reflecting parts including a conical shape, a hyperboloidal surface shape, or an aspheric surface shape.

4. The photographing device according to claim 3, further comprising:
a position calculation section that calculates a position of an object to be photographed, which is to be photographed by the photographing unit, with respect to the display.

5. The photographing device according to claim 3, further comprising:
a motion calculation section that calculates the motion of an object to be photographed, which is to be photographed by the photographing unit, with respect to the display.

6. The photographing device according to claim 2, further comprising:
a position calculation section that calculates a position of an object to be photographed, which is to be photographed by the photographing unit, with respect to the display.

7. The photographing device according to claim 2, further comprising:
a motion calculation section that calculates the motion of an object to be photographed, which is to be photographed by the photographing unit, with respect to the display.

8. The photographing device according to claim 1, further comprising:
a position calculation section that calculates a position of an object to be photographed, which is to be photographed by the photographing unit, with respect to the display.

9. The photographing device according to claim 1, further comprising:
a motion calculation section that calculates the motion of an object to be photographed, which is to be photographed by the photographing unit, with respect to the display.

10. The photographing device according to claim 1, further comprising:
a position calculation section that calculates a position of an object to be photographed, which is to be photographed by the photographing unit, with respect to the display;
a motion calculation section that calculates the motion of an object to be photographed, which is to be photographed by the photographing unit, with respect to the display; and
a display controller that controls display performed by the display, on the basis of calculation results of at least any one of the position calculation section and the motion calculation section.

11. The photographing device according to claim 1, wherein the mirror is capable of being fixed in the vicinity of the photographing unit.

12. The photographing device according to claim 1, further comprising:
an input unit used in order to input data, wherein the input unit is arranged so as to overlap the display.

13. The photographing device according to claim 1, wherein the mirror has a surface shape including a portion of a conical shape.

14. The photographing device according to claim 1, further comprising:
a plurality of the mirrors.

15. The photographing device according to claim 1, wherein the mirror has a plurality of reflecting parts that reflect light.

16. The photographing device according to claim 1, further comprising:
a mounted portion on which the mirror is mounted so as to be arranged at a position where at least a portion of the display is capable of being photographed by the photographing unit.

17. A photographing device comprising:
a photographing unit that is arranged on the same plane as a recording medium, so that the photographing unit is contacted by the plane of the recording medium; and
a mirror that is arranged so that at least a portion of the recording medium is capable of being photographed by the photographing unit,
wherein the photographing unit is arranged at a position such that the photographing unit does not intersect any lines penetrating the portion of the recording medium that is capable of being photographed by the photographing unit, the lines being perpendicular to the portion of the recording medium that is capable of being photographed by the photographing unit.

18. The photographing device according to claim 17, further comprising:
a platform on which on which the recording medium is placed; and
a mounted portion on which the mirror is mounted so as to be arranged at a position where at least a portion of the recording medium placed on the platform is capable of being photographed by the photographing unit.

19. A mirror comprising:
a mounting portion for being mounted on a photographing device, the photographing device including a display that displays a screen and a photographing unit that is arranged on the same plane as the display,
the mirror being mounted on the photographing device using the mounting portion so that at least a portion of the display is capable of being photographed by the photographing unit,
wherein the photographing unit is arranged at a position such that the photographing unit does not intersect any lines penetrating the screen, the lines being perpendicular to the screen.

* * * * *